United States Patent [19]

Iizuka et al.

[11] 3,790,894

[45] Feb. 5, 1974

[54] BINARY SHAPING CIRCUIT

[75] Inventors: Yoshio Iizuka, Yokohama; Tetsuro Morita, Kawasaki, both of Japan

[73] Assignee: Fujitsu Limited, Kawasaki, Japan

[22] Filed: Dec. 23, 1971

[21] Appl. No.: 211,524

[30] Foreign Application Priority Data

Dec. 30, 1970 Japan .............................. 45/122223

[52] U.S. Cl. ............ 328/164, 307/235 R, 307/237, 307/268, 328/34, 328/135

[51] Int. Cl. ..... H03k 5/18, H03k 5/08, H03k 5/156

[58] Field of Search .... 307/235, 237, 268; 328/115, 328/116, 117, 118, 135, 146, 147, 148, 149, 164, 34

[56] References Cited

UNITED STATES PATENTS

| | | | |
|---|---|---|---|
| 3,509,279 | 4/1970 | Martin et al. | 328/135 X |
| 3,070,779 | 12/1962 | Logue | 307/280 X |
| 3,638,183 | 1/1972 | Progler et al. | 307/235 X |
| 3,584,310 | 6/1971 | Hochfelder | 307/235 R X |
| 3,334,298 | 8/1967 | Monrad-Krohn | 328/135 X |
| 3,594,649 | 7/1971 | Rauch | 307/235 R X |
| 3,532,905 | 10/1970 | Zijta et al. | 307/235 X |
| 3,076,145 | 1/1963 | Copeland et al. | 328/147 X |
| 3,130,371 | 4/1964 | Copeland | 328/135 X |
| 3,293,553 | 12/1966 | Brown, Jr. | 328/146 X |
| 3,489,921 | 1/1970 | Mietz et al. | 307/235 |

OTHER PUBLICATIONS

Cackowski et al., "Pulse Detector," IBM Tech. Discl. Bull., Vol. 7, No. 5, p. 344–345, 10/1964.

Dalkiewicz et al., "Intersecting Waveforms Trigger Peak Detector," Electronics, p. 69–70, 5/1/1967.

Kochis et al., "Peak Amplitude Select and Control Circuit," IBM Tech. Discl. Bull., Vol. 12, No. 1, p. 106, 6/1969.

*Primary Examiner*—John W. Huckert
*Assistant Examiner*—L. N. Anagnos
*Attorney, Agent, or Firm*—Arthur E. Wilfond et al.

[57] ABSTRACT

A level setting circuit changes the level of the input signals to a predetermined reference level when the input signals exceed the reference level. A comparator is connected to the level setting circuit and to the input for comparing the input signals with the signals having the reference level produced by the level setting circuit. The comparator produces an output corresponding to the difference in level between the input signals and the reference level. A binary circuit connected to the comparator produces a pulse when the output of the comparator exceeds a predetermined level.

3 Claims, 9 Drawing Figures

BINARY SHAPING CIRCUIT

The present invention relates to a binary shaping circuit. More particularly, the invention relates to a binary shaping circuit for detecting the levels of signals and providing binary shaping in accordance with such levels.

The levels of binary signals read by a facsimile device or the levels of digital binary signals transmitted by a transmission line, for example, vary from each other. It is therefore necessary to provide binary shaping. That is, it is necessary to detect the levels of the signals and divide the signals into 1 and 0 corresponding to the detected level. In facsimile fed signals, especially, errors occur if binary shaping is not provided due to a consideration of the influence of noise.

The principal object of the invention is to provide a new and improved binary shaping circuit which eliminates the influence of noise.

An object of the invention is to provide a binary circuit which is of simple structure and which provides binary signals of high fidelity with efficiency, effectiveness and reliability.

Another object of the invention is to provide a binary shaping circuit which provides binary signals of high fidelity which are not affected by level variations caused by non-uniformity of the brightness of a light source or by noises produced due to aberrations in an optical system.

In accordance with the invention, a binary shaping circuit comprises input means for supplying input signals. Level setting circuit means connected to the input means changes the level of the signals when the input signals exceed a predetermined reference level to the reference level. Comparator means connected to the level setting circuit means and to the input means compares the input signals with the signals having the reference level produced by the level setting means and produces an output corresponding to the difference in level between the input signals and the reference level. Binary circuit means connected to the comparator means produces a pulse when the output of the comparator means exceeds a predetermined level.

Delay circuit means connected between the input means and one of the level setting circuit means and the comparator means delays the input signals.

The delay circuit means may be connected between the input means and the level setting circuit means for delaying the input signals prior to the changing of their levels. The comparator means then compares the input signals with the delayed signals having the reference level.

The delay circuit means may be connected between the input means and the comparator means for delaying the input signals. The comparator means is then connected to the delay circuit means and to the level setting circuit means for comparing the delayed signals with the signals having different levels.

The delay circuit means may comprise a minority carrier storage diode. The level setting circuit means may comprise a limiting circuit for limiting the output signals of the delay circuit means to the reference level. The level setting circuit means comprises a DC overlapping circuit for overlapping direct current on input signals exceeding the reference level.

In order that the invention may be readily carried into effect, it will now be described with reference to the accompanying drawings, in which:

FIG. 1 illustrates facsimile signals read by a facsimile device;

FIGS. 2*a* and 2*b* illustrate waveforms provided by the binary shaping of the facsimile signals of FIG. 1 by a conventional binary shaping circuit;

In the FIGS., the same components are identified by the same reference numerals.

Figure 1:
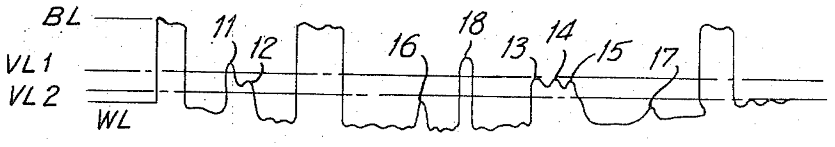
FIG. 1 PRIOR ART

In FIG. 1, which shows the facsimile signals read by a facsimile device, a black level BL shows the read-out signals corresponding to the black level and a white level WL shows the read-out signals corresponding to the white level. The white level WL is not constant in FIG. 1, because a facsimile device generally reads the reflected light of a long light source such as a fluorescent lamp in which the quantity of light is considerable at the central part and is small at the end parts.

In FIG. 1, a plurality of signals 11 to 18 are produced because the frequency of the facsimile signals becomes equivalently high and the response of the reading device is unsatisfactory.

The signals 11 to 18 are essentially signals which should be on the black level BL. It is necessary to divide the signals 11 to 18 into the normal black level BL and the white level WL by binary shaping. This is achieved in the prior art by detecting whether or not the signals exceed a reference level VL1, or a reference level VL2, as shown in FIG. 1.

Figure 2A:
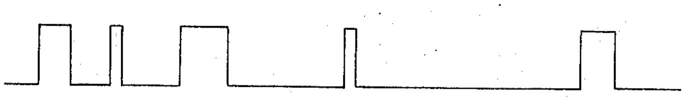
FIG. 2a PRIOR ART
Figure 2B:
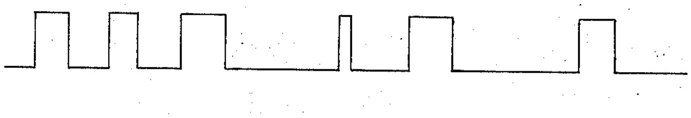
FIG. 2b PRIOR ART

FIGS. 2*a* and 2*b* show waveforms provided by a binary shaping of the signals of FIG. 1 by known binary shaping circuits. The signals of FIG. 2*a* are available when the reference level VL1 is utilized. It is obvious, as shown in FIG. 2*a* that the signals 12 to 17 of FIG. 1, which should be on the black level BL, are actually on the white level WL. If the reference level is lowered to VL2 in order to eliminate this defect, the signals 12 to 15 may be divided to the black level BL. However, another defect arises, since it is difficult to finely divide the signals 11 and 12 and 13 to 15 wherein the black and white levels are alternated. The fidelity of reproduction of the picture is therefore greatly deteriorated.

In accordance with the invention, a binary shaping circuit is provided which eliminates the aforedescribed defect. The binary shaping circuit of the invention is applicable to signals other than facsimile signals, as well as to facsimile signals.

Figure 3:
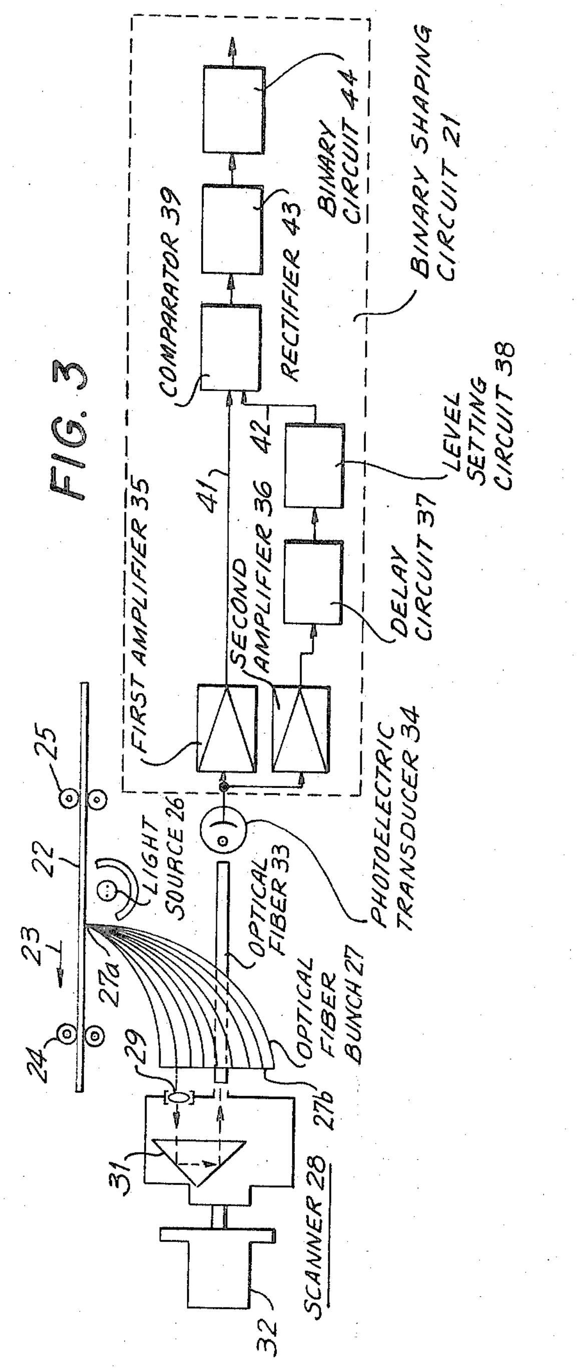
FIG. 3 is a block diagram of an embodiment of the binary shaping circuit of the invention in a facsimile system.

FIG. 3 illustrates an embodiment of the binary shaping circuit of the invention as utilized in a facsimile device. In FIG. 3, the binary shaping circuit 21 is a first embodiment of the binary shaping circuit of the invention. Reproducible material provided on a record medium 22 is fed in the direction of an arrow 23 by guide rollers 24 and 25 and is irradiated by light produced by a light source 26. The reflected light is focused by an optical fiber bunch 27. One end 27*a* of the optical fiber bunch 27 is provided at the record medium 22 and extends substantially linearly in a direction substantially perpendicular to the direction of feeding of the record medium.

The other end 27b of the optical fiber bunch 27 is substantially circular and faces a scanner 28. The scanner 28 comprises a lens 29 and a prism 31. The scanner 28 is rotated by a motor 32. The light from the scanner 28 is supplied via single optical fiber 33 to a photoelectric transducer 34. The photoelectric transducer may comprise a suitable photosensitive component such as, for example, a photomultiplier tube. The electrical output signals produced by the photoelectric transducer 34 are the read-out facsimile signals shown in FIG. 1.

Figure 6A:
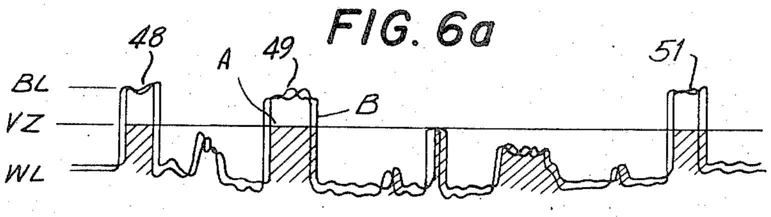
FIGS. 6*a*, 6*b* and 6*c* illustrate waveforms provided by the binary shaping of facsimile signals by the binary shaping circuit of the present invention.

The read-out facsimile signals, which are the electrical signals produced by the photoelectric transducer 34, are supplied to a first amplifier 35 and to a second amplifier 36. The first and second amplifiers 35 and 36 amplify the electrical signals to a suitable level. Furthermore, in the first and second amplifiers 35 and 36, a direct current is overlapped on the signals. This changes the DC level of the output signal A produced by the first amplifier 35 with regard to the DC level of the output signal B produced by the second amplifier 36, as shown in FIG. 6a. The output signals produced by the second amplifier 35 are supplied to a delay circuit 37. As shown in FIG. 6a, the delay circuit shifts the phase of the output signal of the second amplifier 36 with regard to the phase of the output signals of the first amplifier 35.

A level setting circuit, limiter circuit, slicer circuit, or the like, 38 is connected to the output of the delay circuit 37. The level setting circuit 38 cuts off the portions of the signals at the output of the delay circuit 37 which exceed a predetermined constant reference level VZ, as shown in FIG. 6a. This results in the signals indicated by oblique lines in FIG. 6a being produced at the output of the level setting circuit 38. The output signals of the level setting circuit 38 thus have the reference level.

Figure 6B:
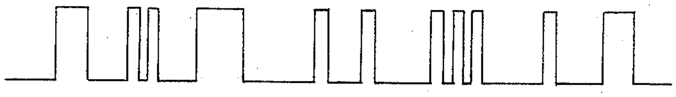

A comparator 39 has one input connected to the output of the first amplifier 35 via a lead 41 and a second input connected to the output of the level setting circuit 38 via a lead 42. The comparator 39 compares the input signals at the output of the first amplifier 35 with the constant level signals produced by the level setting circuit 38 and produces an output voltage corresponding to the difference between such signals. A rectifier 43 is connected to the output of the comparator and passes only forward-directed voltages produced by the comparator 39. A binary circuit 44 is connected to the output of the rectifier 43. The binary circuit 44 produces an output pulse when the output comparator 39 exceeds a predetermined level. This results in binary shaping, as shown in FIG. 6b.

Figure 6C:
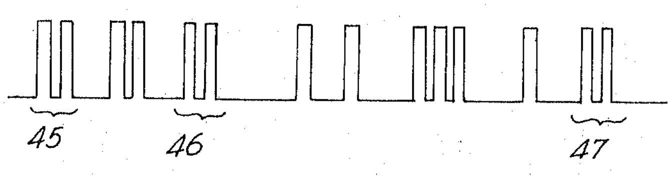

In the aforedescribed opeation, the DC level of the output signals B of the second amplifier 36 is made different from the DC level of the output signals A of the first amplifier 35. Furthermore, the output signals B of the second amplifier 36 are limited to the constant reference level VZ in order to prevent the influence of noise caused by binary error on the black level BL and on the white level WL. If the output signals B of the second amplifier 36 are not cut off or sliced at the constant reference level VZ, the black levels BL which should be continued are interrupted, as shown at 45, 46 and 47 in FIG. 6c, because of the level variations due to noise, as shown at 48, 49 and 51 of FIG. 6a.

It is obvious from the foregoing that the fidelity of the binary shaped signals produced by the binary shaping circuit of the invention is superior to the fidelity of signals produced by similar prior art circuits, as shown in FIG. 2.

Figure 4:
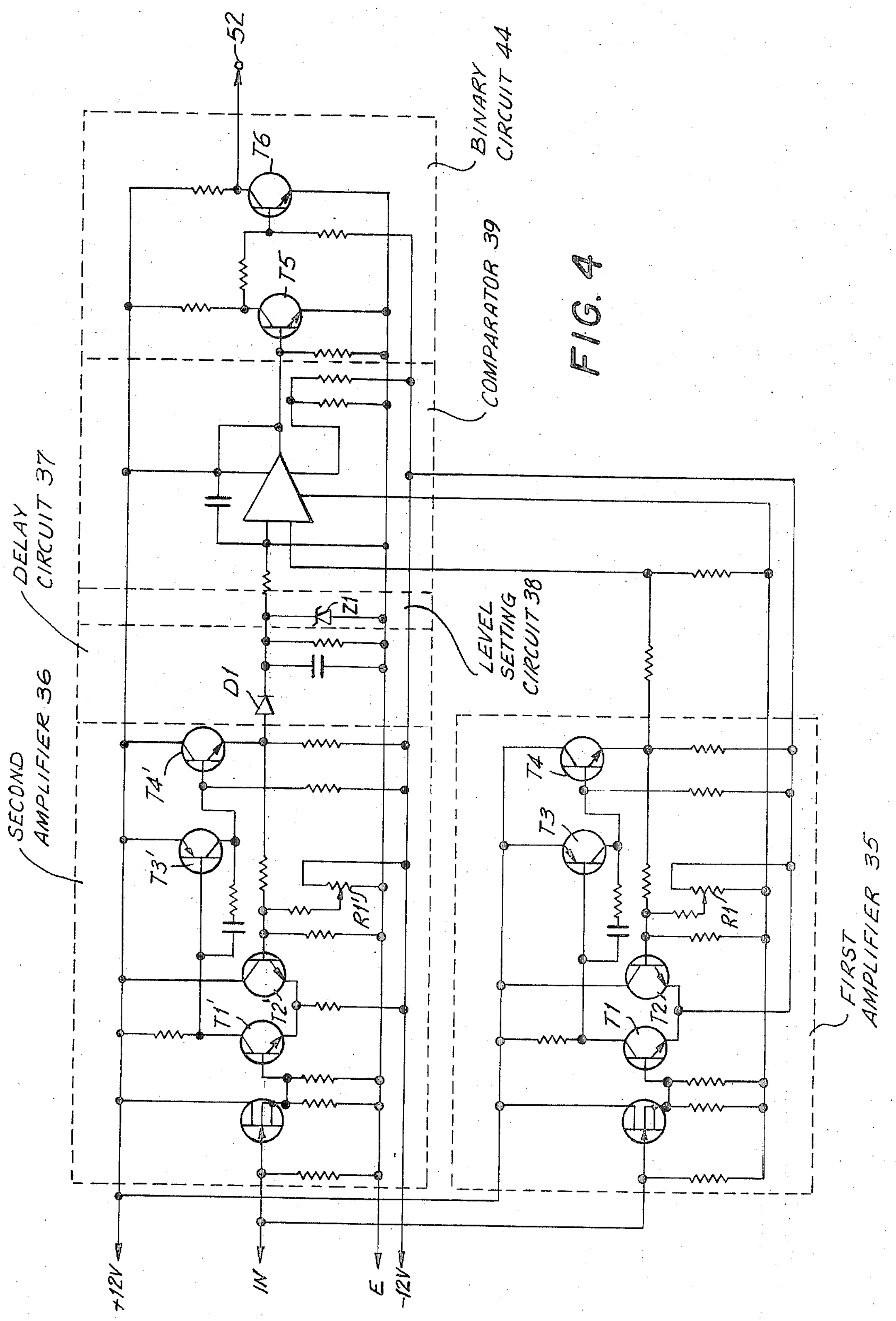
FIG. 4 is a circuit diagram of the embodiment of FIG. 3 of the binary shaping circuit of the invention.

FIG. 4 is a circuit diagram of the binary shaping circuit 21 of FIG. 3. In FIG. 4, each of the first and second amplifiers 35 and 36 comprises a differential amplifier having transistors T1 and T2, and T1′ and T2′. The outputs of the differential amplifiers T1, T2, and T1′, T2′ are supplied to an emitter follower circuit comprising transistors T3 and T4, and T3′ and T4′. The emitter follower circuits T3, T4 and T3′ and T4′ are coupled to the differential amplifiers by Dirlington connections. In each of the first and second amplifiers 35 and 36, the output of the emitter electrode of the emitter follower circuit is negatively fed back to the base electrode of the transistors T2 and T2′ of the differential amplifier. A resistor R1 in the first amplifier 35 and a resistor R1′ in the second amplifier 36 varies the DC overlapped levels.

The delay circuit 37 provides a delay time of several microseconds and utilizes the minority carrier storage diode D1. The level setting circuit 38 comprises a Zener diode Z1. Since the Zener voltage cannot be made variable, the level setting voltage must be made variable by varying the DC overlapped levels via the resistors R1 and R1′ of the first and second amplifiers 35 and 36.

The comparator 39 comprises a differential amplifier which compares the output of the first amplifier 35 with the output of the level setting circuit 38 and produces a positive output voltage proportional to the output of said first amplifier only when said first amplifier produces an output which is greater than the output of said level setting circuit. The rectifier 43 of FIG. 3 is thus not necessary in FIG. 4. The binary circuit 44 comprises switching circuits of two stages having transistors T5 and T6. When the output of the comparator 39 exceeds a specific level, the transistor T6 is cut off and a positive pulse is produced at an output terminal 52. This indicates that binary shaping has been performed.

Figure 5:
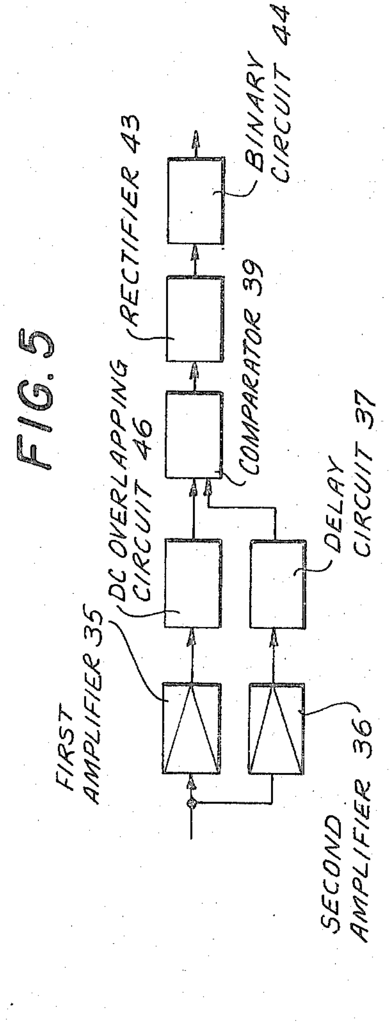
FIG. 5 is a block diagram of another embodiment of the binary shaping circuit of the invention.

The embodiment of FIG. 5 of the binary shaping circuit of the invention is different from that of FIG. 3, since the embodiment of FIG. 5 eliminates the level setting circuit 38 of FIG. 3. The embodiment of FIG. 5 utilizes a DC overlapping circuit 46. The DC overlapping circuit 46 has an output connected to the first input of the comparator 39 and an input connected to the output of the first amplifier 35. The DC overlapping circuit 46 functions to overlap the DC component on signals which exceed the constant refernce level VZ (FIG. 6a) produced by the first amplifier 35. The DC overlapping circuit 46 provides a level difference between the output signals of the first amplifier 35 and the delayed signals provided by the delay circuit 37. This enables the embodiment of FIG. 5 to provide the relation shown in FIG. 6a. In FIG. 5, the output of the delay circuit 37 is connected to the second input of the comparator 39.

It is evident from the foregoing description that the binary shaping circuit of the present invention provides binary signals of high fidelity which are not affected by level variations caused by non-uniformity of the brightness of the light source of the facsimile system or noises produced due to an aberration in the optical system of the facsimile system. This is accomplished by making the level of an input signal different from the level of a signal delayed with regard to the input signal when the input signal exceeds a constant level which is, for example, about the black level.

The present invention is not limited to the aforedescribed embodiments, but encompasses various modifications and changes which may be made therein. Although the binary shaping of facsimile signals has been described herein, the binary shaping circuit of the invention may be utilized, for example, for the regenerative repeating of digital signals in a repeater of a PCM transmission system.

While the invention has been described by means of specific examples and in specific embodiments, it should not be limited therto, for obvious modifications will occur to those skilled in the art without departing from the spirit and scope of the invention.

We claim:

1. A binary shaping circuit, comprising input means for supplying input signals; delay circuit means connected to the input means for delaying the input signals; level setting circuit means connected to the delay circuit means for changing the level of said delayed signals to a predetermined reference level when said delayed signals exceed the reference level; comparator means connected to the level setting circuit means and to the input means for comparing the input signals and said changed signals and for producing the output signals corresponding to the difference in level between the input signals and said changed signals; and binary circuit means connected to the comparator means for producing a pulse when said output signals exceeds a predetermined level.

2. A binary shaping circuit, comprising input means for supplying input signals; level setting circuit means connected to the input means for changing the level of the input signals to a predetermined reference level when the input signals exceed the reference level; delay circuit means connected to the level setting circuit means for delaying said changed signals; comparator means connected to the delay circuit means and to the input means for comparing the input signals and said delayed signals and for producing the output signals corresponding to the difference in level between the inpul signals and said delayed signals; and binary circuit means connected to the comparator means for producing a pulse when said output signals exceeds a predetermined level.

3. A binary shaping circuit, comprising input means for supplying input signals; delay circuit means connected to the input means for delaying the input signals; level setting circuit means connected to the input means for changing the level of the input signals to a predetermined reference level when the input signals exceed the reference level; comparator means connected to the delay circuit means and to the level setting circuit means for comparing said delayed signals and said changed signals and for producing the output signals corresponding to the difference in level between said delayed signals and said changed signals; and binary circuit means connected to the comparator means for producing a pulse when said output signals exceeds a predetermined level.

* * * * *